(12) United States Patent
Lumb et al.

(10) Patent No.: US 7,643,983 B2
(45) Date of Patent: Jan. 5, 2010

(54) DATA STORAGE SYSTEM EMULATION

(75) Inventors: Christopher Lumb, Pittsburgh, PA (US); Arif Merchant, Los Altos, CA (US); Guillermo Alvarez, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1514 days.

(21) Appl. No.: 10/400,232

(22) Filed: Mar. 27, 2003

(65) Prior Publication Data
US 2004/0193397 A1 Sep. 30, 2004

(51) Int. Cl.
G06F 9/455 (2006.01)
G06F 13/10 (2006.01)
G06F 12/00 (2006.01)
G06F 17/30 (2006.01)

(52) U.S. Cl. ............... 703/24; 703/20; 703/21; 703/23; 703/25; 711/112; 711/4; 711/154; 707/1; 707/204; 707/205; 707/10

(58) Field of Classification Search ............. 703/23–25; 711/112; 707/10
See application file for complete search history.

(56) References Cited

U.S. PATENT DOCUMENTS

| | | | |
|---|---|---|---|
| 4,603,382 A * | 7/1986 | Cole et al. ............ 710/56 |
| 4,642,759 A * | 2/1987 | Foster ............... 703/24 |
| 5,070,474 A * | 12/1991 | Tuma et al. .......... 703/24 |
| 5,088,058 A * | 2/1992 | Salsburg ............ 703/25 |
| 5,239,659 A | 8/1993 | Rudeseal et al. |
| 5,297,124 A * | 3/1994 | Plotkin et al. ........ 360/49 |
| 5,313,617 A * | 5/1994 | Nakano et al. ....... 703/24 |
| 5,394,532 A * | 2/1995 | Belsan ............... 711/114 |
| 5,410,667 A * | 4/1995 | Belsan et al. ........ 711/114 |
| 5,426,736 A * | 6/1995 | Guineau, III ........ 710/3 |
| 5,438,674 A * | 8/1995 | Keele et al. ......... 711/4 |
| 5,455,926 A * | 10/1995 | Keele et al. ......... 711/4 |

(Continued)

OTHER PUBLICATIONS

Alvarez, G. A., Borowsky, E., Go, S., Romer, T. H., Becker-Szendy, R., Golding, R., Merchant, A., Spasojevic, M., Veitch, A., and Wilkes, J. 2001. Minerva: An automated resource provisioning tool for large-scale storage systems. ACM Trans. Comput. Syst. 19, 4 (Nov. 2001), 483-518. DOI= http://doi.acm.org/10.1145/502912.502915.*

(Continued)

*Primary Examiner*—Kamini S Shah
*Assistant Examiner*—Akash Saxena

(57) ABSTRACT

A technique for emulation of a data storage system. The invention allows the level of services to be provided by a data storage system to be specified in terms of the level of services provided by another storage system. In one aspect, a performance characterization of a data storage device to be emulated is obtained (e.g., by experimental techniques). A specification of a workload is also obtained that includes a specification of a plurality of data stores for the workload. The data stores are assigned to an emulation data storage device according to the performance characterization and according to the specification of the workload such that sufficient resources of the emulation data storage device are allocated to the workload to meet the performance characterization of the data storage device to be emulated. The emulation data storage device is then operated under the workload. Quality-of-service (QoS) control may be performed so as to provide a degree of performance isolation among the workloads.

38 Claims, 6 Drawing Sheets

U.S. PATENT DOCUMENTS

| | | | |
|---|---|---|---|
| 5,459,857 A | | 10/1995 | Ludlum et al. |
| 5,530,845 A * | | 6/1996 | Hiatt et al. .................... 703/27 |
| 5,680,539 A * | | 10/1997 | Jones ............................ 714/6 |
| 5,925,119 A * | | 7/1999 | Maroney ..................... 710/315 |
| 6,070,224 A * | | 5/2000 | LeCrone et al. ............. 711/112 |
| 6,094,605 A * | | 7/2000 | Blendermann et al. ....... 700/214 |
| 6,098,148 A * | | 8/2000 | Carlson ....................... 711/112 |
| 6,119,174 A * | | 9/2000 | Borowsky et al. ............ 710/15 |
| 6,157,963 A * | | 12/2000 | Courtright et al. ............ 710/5 |
| 6,226,712 B1* | | 5/2001 | Carlson et al. .............. 711/112 |
| 6,237,062 B1* | | 5/2001 | Carlson et al. .............. 711/112 |
| 6,256,706 B1* | | 7/2001 | Carlson et al. .............. 711/112 |
| 6,269,410 B1* | | 7/2001 | Spasojevic .................... 710/5 |
| 6,275,855 B1* | | 8/2001 | Johnson ...................... 709/224 |
| 6,330,621 B1* | | 12/2001 | Bakke et al. ................... 710/5 |
| 6,336,163 B1* | | 1/2002 | Brewer et al. ............... 711/112 |
| 6,343,342 B1* | | 1/2002 | Carlson ....................... 711/112 |
| 6,421,723 B1* | | 7/2002 | Tawil .......................... 709/224 |
| 6,473,809 B1* | | 10/2002 | Aref et al. ....................... 710/6 |
| 6,529,996 B1* | | 3/2003 | Nguyen et al. .............. 711/114 |
| 6,606,585 B1* | | 8/2003 | Borowsky et al. ............. 703/2 |
| 6,640,278 B1* | | 10/2003 | Nolan et al. .................... 711/6 |
| 6,704,839 B2* | | 3/2004 | Butterworth et al. ......... 711/114 |
| 6,725,456 B1* | | 4/2004 | Bruno et al. ................. 718/102 |
| 6,738,386 B1* | | 5/2004 | Holmqvist ................... 370/412 |
| 6,782,372 B1* | | 8/2004 | Cooper et al. ................... 706/8 |
| 6,816,917 B2* | | 11/2004 | Dicorpo et al. ................ 710/5 |
| 6,832,186 B1* | | 12/2004 | Margulieux ................... 703/24 |
| 6,865,527 B2* | | 3/2005 | Go et al. ....................... 703/22 |
| 6,874,060 B2* | | 3/2005 | Blood et al. ................. 711/111 |
| 6,952,734 B1* | | 10/2005 | Gunlock et al. ............. 709/227 |
| 6,954,768 B2* | | 10/2005 | Carlson et al. .............. 707/205 |
| 6,954,831 B2* | | 10/2005 | Carlson et al. .............. 711/154 |
| 6,957,291 B2* | | 10/2005 | Moon et al. .................. 710/302 |
| 6,978,259 B1* | | 12/2005 | Anderson et al. ............ 706/19 |
| 6,978,325 B2* | | 12/2005 | Gibble et al. ................. 710/33 |
| 6,985,916 B2* | | 1/2006 | Carlson et al. .............. 707/205 |
| 7,035,971 B1* | | 4/2006 | Merchant .................... 711/114 |
| 2001/0047471 A1* | | 11/2001 | Johnson .......................... 713/1 |
| 2002/0002631 A1* | | 1/2002 | Haulund et al. ............. 709/314 |
| 2002/0004796 A1* | | 1/2002 | Vange et al. .................. 707/10 |
| 2002/0103923 A1* | | 8/2002 | Cherian et al. .............. 709/235 |
| 2002/0188592 A1* | | 12/2002 | Leonhardt et al. .............. 707/1 |
| 2003/0061362 A1* | | 3/2003 | Qiu et al. ..................... 709/229 |
| 2003/0120476 A1* | | 6/2003 | Yates et al. ................... 703/24 |
| 2003/0208284 A1* | | 11/2003 | Stewart et al. ............... 700/30 |
| 2003/0236942 A1* | | 12/2003 | Kishi et al. .................. 711/113 |
| 2004/0008484 A1* | | 1/2004 | Konshak et al. ............. 361/687 |
| 2004/0010660 A1* | | 1/2004 | Konshak et al. ............. 711/114 |
| 2004/0044852 A1* | | 3/2004 | Carlson et al. .............. 711/154 |
| 2004/0078185 A1* | | 4/2004 | Briggs et al. .................. 703/24 |
| 2004/0139240 A1* | | 7/2004 | DiCorpo et al. ................ 710/3 |
| 2004/0177228 A1* | | 9/2004 | Leonhardt et al. ........... 711/170 |
| 2004/0194095 A1* | | 9/2004 | Lumb et al. .................. 718/100 |
| 2005/0204108 A1* | | 9/2005 | Ofek et al. ................... 711/162 |
| 2006/0010275 A1* | | 1/2006 | Moon et al. .................. 710/302 |

OTHER PUBLICATIONS

Golding, R. and Wilkes, J. 1998. Persistent storage for distributed applications. In Proceedings of the 8th ACM SIGOPS European Workshop on Support for Composing Distributed Applications (Sintra, Portugal). EW 8. ACM Press, New York, NY, 53-57. DOI= http://doi.acm.org/10.1145/319195.319204.*

Borowsky, E., Golding, R., Merchant, A., Schreier, L., Shriver, E., Spasojevic, M., And Wilkes, J.; 1997. Using attribute-managed storage to achieve QoS. In Proceedings of the 5th Intl.Workshop on Quality of Service (Jun. 1997).*

(Annotated with comments) Traveling to Rome: QoS specifications for automated storage system management; John Wilkes; Proceedings of the International Workshop on Quality of Service (IWQoS), Karlsruhe, Germany, Jun. 2001. © Springer-Verlag.*

Borowsky, E., Golding, R., Jacobson, P., Merchant, A., Schreier, L., Spasojevic, M., and Wilkes, J. 1998. Capacity planning with phased workloads. In Proceedings of the 1st international Workshop on Software and Performance (Santa Fe, New Mexico, United States, Oct. 12-16, 1998). WOSP '98. ACM Press, New York, NY, 199-207. DOI= http://doi.*

Dynamic Function Placement for Data-intensive Cluster Computing; USENIX Annual Technical Conference, San Diego, CA, Jun. 2000. Khalil Amiri, David Petrou, Gregory R. Ganger, Garth A. Gibson Carnegie Mellon University.*

Parallel Data Lab: Index of research papers from years 1992-2006 (http://www.pdl.cs.cmu.edu/index.html).*

Index of HP Lab Research Publications related to Storage Management/storage systems/ etc (http://www.hpl.hp.com/research/ssp/papers).*

I. A. Pratt, "User-Safe Devices for True End-to-End QoS", Proceedings of the IEEE 7th International Workshop on Network and Operating System Support for Digital Audio and Video, May 19-21, 1997, St. Louis, MO. New York: IEEE, 1997.

Lan Huang. "Stonehenge: A High Performance Virtualized Storage Cluster with QoS Guarantees." Thesis Proposal. Stony Brook: Computer Science Department, SUNY at Stony Brook, Jan. 2002.

Prashant J. Shenoy and Harrick M. Vin, "Cello: A Disk Scheduling Framework for Next Generation Operating Systems." SIGMETRICS '98/ Performance '98 Joint International Conference on Measurement and Modeling of Computer Systems : proceedings; Jun. 22-26, 1998, Madison, Wisconsin. New York: Association for Computing Machinery, NY, 1998.

Kartik Gopalan and Tzi-cker Chiueh. "Multi-Resource Allocation and Scheduling for Periodic Soft Real-Time Applications." Proceedings of SPIE vol. 4673 Multimedia Computing and Networking 2002 (MMCN2002) San Jose, CA. Bellingham: SPIE, 2002. pp. 34-45.

John Wilkes."Traveling to Rome: QoS specifications for automated storage system management." Proceedings 9th International Workshop on Quality of Service (IWQoS' 2001) (Jun. 6-8, 2001, Karlsruhe, Germany). Eds. L. Wolf, D. Hutchinson. R. Steinmetz. Berlin, Germany: Springer-Verlag, Jun. 2001. pp. 75-91.

Tzi-cker Chiueh, Lan Huang, Gang Peng. "Stonehenge: A High Performance Virtualized Network Storage Cluster with QoS Guarantees". Stony Brook: Computer Science Department, SUNY of Stony Brook, Jan. 27, 2002. < http://www.ecsl.cs.sunysb.edu/stonehenge/>.

* cited by examiner

DATA STORAGE SYSTEM EMULATION

This application is related to U.S. application Ser. No. 10/400,556, filed, Mar. 27 2003, and entitled, "Quality of Service Controller and Method for a Data Storage System," the contents of which are hereby incorporated by reference.

BACKGROUND OF THE INVENTION

The present invention relates to data storage systems. More particularly, the present invention relates to emulation of data storage systems.

Due to such factors as advances in technology, reductions in computer hardware costs and growth of the World Wide Web, increasing quantities of digital data are being generated worldwide. For example, computer systems in businesses, government and homes are used to generate data in the form of text and other documents, databases, multi-media files, e-mail correspondence, web pages, transaction records, and so forth. As a result, data storage demands are enormous and are growing over time.

Driven by this increasing demand, data storage systems are becoming larger and more complex. For example, a modern data center may include tens of large arrays and thousands of logical volumes and file systems. Such a data center may serve the storage demands of a large organization or even multiple organizations.

Increasingly, organizations outsource their data storage and management needs to a storage service provider (SSP). The SSP allocates storage on its own disk arrays that it makes available to its customers. While an organization may serve its storage needs internally, by purchasing equipment and hiring appropriate personnel, the organization may also internally follow an SSP model for providing storage services to its separate divisions.

A prospective customer of an SSP who wishes to outsource its data storage needs may be familiar with a particular make and model of a storage device. Accordingly, the customer may wish to specify that the SSP provide such a device for the customer's storage needs. Dedicating a specified device to the customer can be expensive, however, especially where the SSP does not already have such a device available. This can also be inflexible since any future changes in the customer's requirements may necessitate physical reconfiguration of the hardware or possibly the purchase of additional hardware. Such a solution may also result in a proliferation of device types, complicating management of them by the SSP.

Where an SSP does not provide dedicated storage devices to each customer, delivering performance desired by each customer can be difficult because each presents an independent load to the SSP that competes for storage resources, such as cache space, disk, bus, and network bandwidth and process cycles of a storage controller.

Therefore, what is needed is an ability to specify the service level that a workload will receive from a storage system in terms known storage devices. What is further needed is an ability for such a storage system to handle multiple independent workloads. It is to these ends that the present invention is directed.

SUMMARY OF THE INVENTION

The invention is a system and method for emulation of a data storage system. The invention allows the level of services to be provided by a data storage system to be specified in terms of the level of services provided by another storage system.

In one aspect, a performance characterization of a data storage device to be emulated is obtained (e.g., by experimental techniques). A specification of a workload is also obtained that includes a specification of a plurality of data stores for the workload. The data stores are assigned to an emulation data storage device according to the performance characterization and according to the specification of the workload such that sufficient resources of the emulation data storage device are allocated to the workload to meet the performance characterization of the data storage device to be emulated. The emulation data storage device is then operated under the workload.

Quality-of-service (QoS) control may be performed so as to provide a degree of performance isolation among the workloads. This may include prioritizing a plurality of requests for each of the plurality of workloads, selectively forwarding the requests to a device queue of the emulation device according to said prioritizing for maintaining the queue at a target queue depth and adjusting the target queue depth in response to a latency statistic for the requests wherein the latency statistic is computed based on a difference between an arrival time and a completion time of a plurality of the requests.

These and other aspects of the invention are described in more detail herein.

DETAILED DESCRIPTION OF A PREFERRED EMBODIMENT

The present invention provides a system and method for emulation of a data storage system. The invention allows the level of services to be provided by a data storage system to be specified in terms of the level of services provided by another storage system. For example, a customer (hereinafter "Client 1") may specify to a storage service provider (SSP) that it would like to receive a level of service that is equivalent to that of three devices of model number VA-7100 (available from Hewlett-Packard Company) each equipped with ten 60 GB disks. The SSP may not have these physical devices available and may, instead, have a different device, such as a large, high-performance device of model number XP-1024 (available from Hewlett-Packard Company). The SSP may employ the present invention to emulate the specified performance of the three VA-7100 devices on its XP-1024 device for that customer. Thus, the invention is particularly useful where a customer of a storage service provider (SSP) wishes to specify a level of service to be provided in terms of a particular make and model of a storage device that the customer is already familiar with, while the SSP has different devices available. The SSP may then emulate the specified devices using the available devices, avoiding the need to obtain and dedicate the actual specified device to the customer. The SSP can be internal to the customer or may be an external service provider.

In one embodiment, the invention provides for the emulation of multiple devices for multiple workloads to be serviced, in which case, the emulated devices may be different from each other. To illustrate using the example above, the SSP may also allocate a portion of the XP-1024 to another customer (hereinafter "Client 2") that specifies that it would like to receive a level of service that is equivalent to that of a single device of model number FC-60 (available from Hewlett-Packard Company). In this case, the SSP may employ the invention to allocate a portion of the XP-1024 to Client 1, who requested three model number VA-7100 devices, in addition to allocating a portion of the same XP-1024 device to Client 2, who requested service of an FC-60 device. Thus, in this example, the invention employs the XP-1024 device to simultaneously emulate three VA-7100 devices for Client 1 and an FC-60 device for Client 2. In other embodiments, more than two clients may be accommodated. Also, there is no requirement that the clients all specify different devices. Rather, two or more clients may specify the same device to be emulated (e.g., an FC-60), though the SSP allocates different portions of the emulation device (e.g., an XP-1024) to each.

Figure 1:
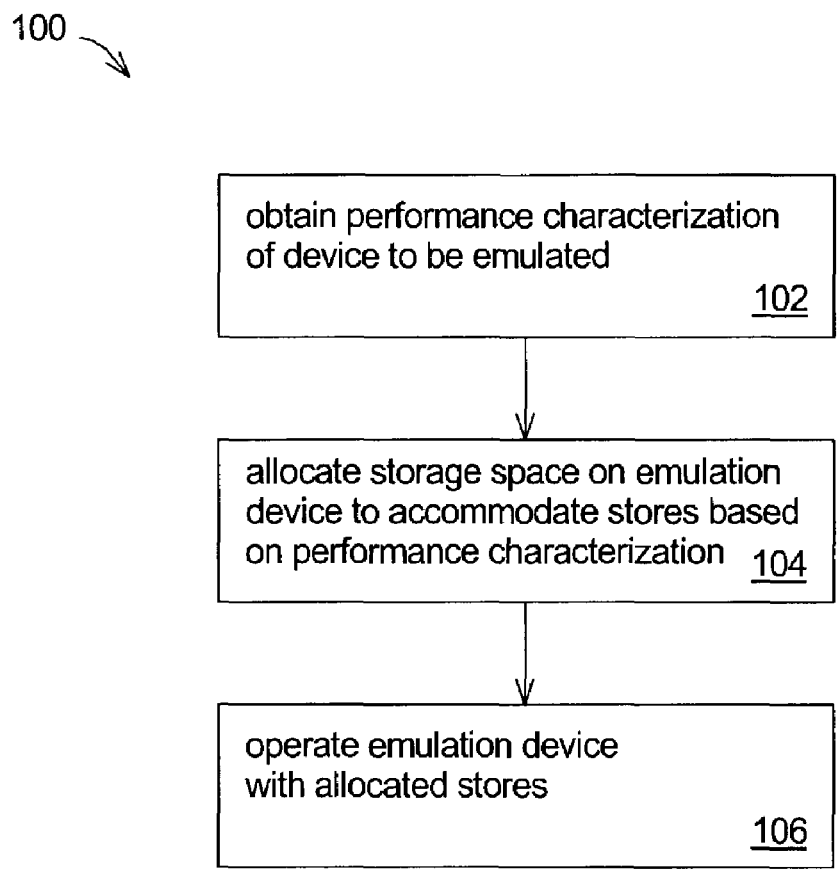
FIG. 1 illustrates a flow diagram of a method for emulating a storage system according to an aspect of the present invention.

FIG. 1 illustrates a flow diagram of a method 100 for emulating a storage system according to an aspect of the present invention. In a step 102, a performance characterization of a device to be emulated is obtained. In the examples above, the three VA-7100 devices and the FC-60 device are to be emulated. Thus, their performance characterizations may be obtained in step 102.

A performance characterization for a device includes values for metrics that characterize the performance of the device. This may include, for example, a maximum rate of input/output (I/O) requests that the device can handle for performing read or write operations (e.g., in I/O's per second), a maximum bandwidth for data storage and retrieval (e.g., in bytes per second), an average response time (i.e. the latency or time required to perform an I/O request), a maximum response time, or a functional mapping of workload characteristics. A functional mapping may include values for a performance metric as a function of a workload parameter. For example, the functional mapping may specify latency (a performance metric) as a function of request rate (a workload parameter) since latency typically increases as the rate of I/O's increases. Other workload parameters that may be mapped to performance measures include, for example, I/O size, read/write ratio, and so forth. Other characteristics may be included in the performance characterization, such as expected availability (e.g., uptime per year or a ratio of uptime to total time) or reliability (e.g., a number of failures expected per year).

Obtaining the characterization in step 102 may be accomplished, for example, through conventional experimental techniques in which a number of tests are performed on an available device that is appropriately configured. For this purpose, the device may be tested under a trace obtained from a real workload or from a synthetic workload. A library of previously obtained characterizations may be maintained and drawn upon to obtain the performance characterization for a particular device. Further, published specifications, such as from a device manufacturer, may be used to obtain to the performance characterization. Rather than use an actual device, the device may be simulated, such as by a software simulation program or tool, in order to obtain its performance characterization. It will be apparent that any combination of these techniques may be used in step 102. For example, manufacturer's published specifications for a device may be used as the basis for constructing a software model of the device.

In step 104, storage space is allocated on an emulation device to accommodate data stores for the workloads to be serviced by the device. In the examples above, the XP-1024 is an emulation device whereas the workloads to be serviced by the XP-1024 include the workloads of Client 1 and Client 2.

Figure 2:
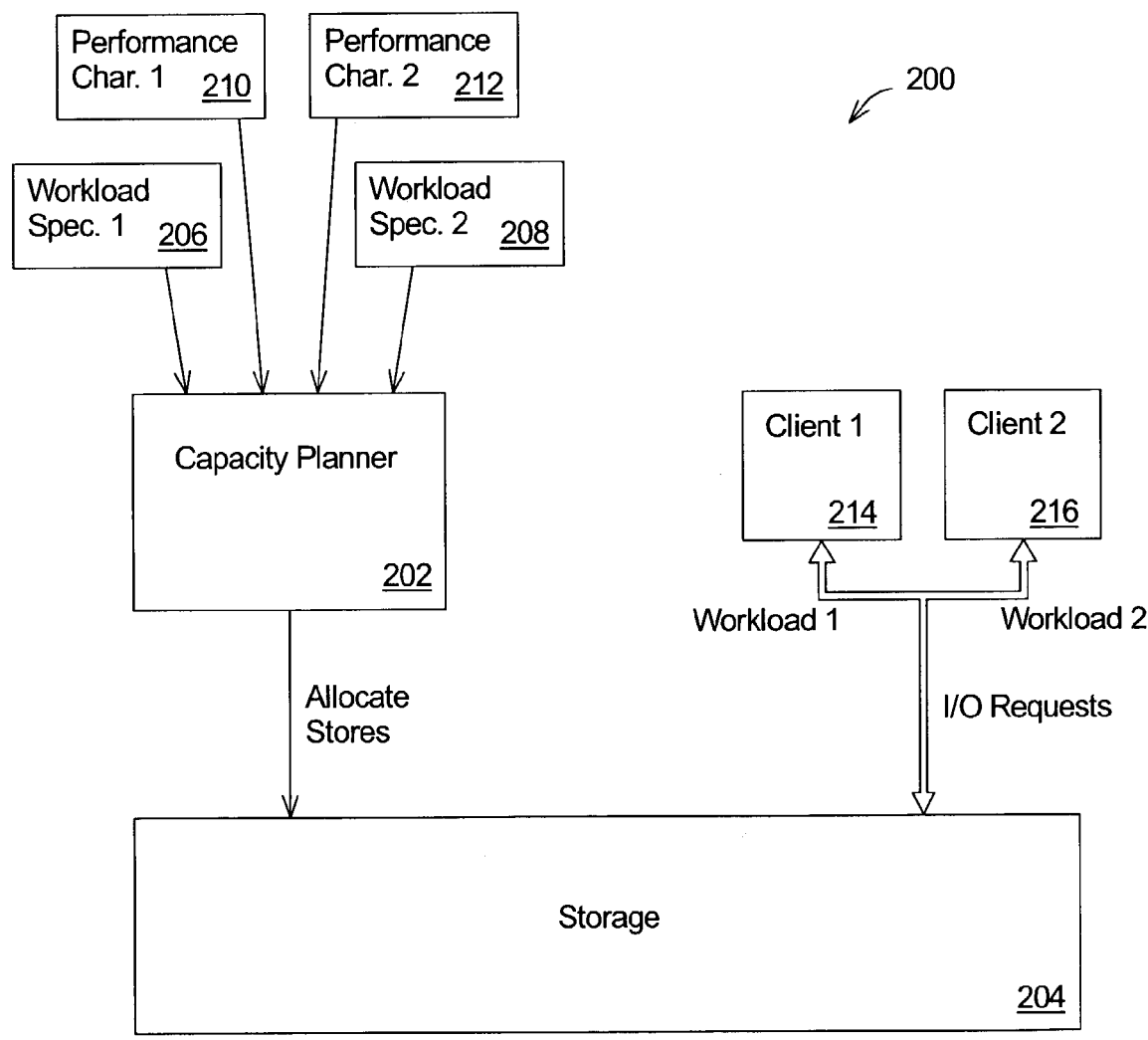
FIG. 2 illustrates a data storage emulation system according to an aspect of the present invention.

FIG. 2 illustrates a data storage emulation system 200 according to an aspect of the invention. The system includes a capacity planner 202, which may be used to perform step 104 of the method 100, and storage device(s) 204, such as one or more hard disk arrays. Storage 204 includes the emulation device, such as the XP-1024 in the examples above. While in the example, a single device (i.e. an XP-1024 device) serves as the emulation device, multiple devices may be used. For example, storage 204 may include several devices whose storage resources are aggregated, such as by employing a logical volume manager.

The capacity planner 202 receives as input a specification of one or more workloads. Exemplary workload specifications are illustrated in FIG. 2 as input to the planner 202. In the example, workload specification 206 may be for Client 1 and workload specification 208 may be for Client 2. A system administrator may provide the workload specifications 206-208 to the planner 202. The workload specifications may include, for example, a number of data stores (i.e. virtualized storage space) required by each workload and the capacity (i.e. the quantity of storage space) required by each of these data stores. In addition, performance criterion obtained in step (FIG. 1) for the workloads, such as a specification of allowable I/O request latencies based on the rate of request generation, may be input to the system 200. As shown in FIG. 2, exemplary performance characterizations 210-212 are inputs to the planner 202. In the example, the performance characterization 210 may be obtained for the three VA-7100 devices to be emulated for Client 1, while the performance characterization 212 may be obtained for the FC-60 to be emulated for Client 2.

The capacity planner 202 allocates storage for each workload in the storage 204 by assigning the stores to the emulation devices and also ensures that the emulation devices have sufficient capacity and bandwidth to meet the aggregate demands of the workloads. This allocation may be changed periodically to meet changing requirements of the workloads and changes to configurations of the devices 204. The capacity planner 202 may be implemented as a general-purpose computer system programmed to perform the capacity planning steps. The physical configuration of the devices 204 indicated by the capacity planner 202 may be performed, for example, by the system administrator.

In one aspect, the capacity planner 202 operates in accordance with U.S. patent application Ser. No. 10/046,463, filed Oct. 23, 2001 and entitled, "Automated System Adaptation Technique Particularly for Data Storage Systems," the contents of which are hereby incorporated by reference. For this planner 202, a sequence of steps is performed in an iterative loop, including analyzing the operation of the storage devices 204 under the workloads, generating a new design based on the analysis and migrating the existing system to the new design. By programmatically repeating these tasks, the capacity plan converges to one that supports the workload without being over-provisioned.

In another aspect, the capacity planner 202 operates in accordance with U.S. patent application Ser. No. 09/924,735, filed Aug. 7, 2001 and entitled, "Simultaneous Array Configuration and Store Assignment for a Data Storage System,"

the contents of which are hereby incorporated by reference. For this planner 202, a data structure having a plurality of nodes is stored in a computer-readable memory. At least some of the nodes correspond to the physical data storage devices 204 having respective attributes. A plurality of data stores to be used by the workloads each have data storage requirements, such as capacity and bandwidth requirements, that are provided as input. The data stores are assigned recursively into the hierarchy, checking at each node that none of the attributes are exceeded by the requirements of the store. While the stores are assigned, the hierarchy may be modified to better accommodate the stores. The possible assignments which to not violate any attributes may be compared to each other according to goals of the system.

The above-described capacity planners 202 for use in the method 100 of FIG. 1 are exemplary. As such, it will be apparent that another planner may be selected. Further, the capacity planning may be performed and implemented in accordance with conventional manual techniques.

In step 106 of the method 100, the emulation device 204 is operated under the workloads according to the allocations of the data stores made in step 104. Step 106 is illustrated in FIG. 2 by client systems 214-216 which are coupled to the emulation device 204 for performing storage operations. Client systems 214-216 may include, for example, one or more computer systems at a client location on which one or more applications are running where the applications generate I/O requests (i.e. read and write operations) to the storage devices 204. Each workload includes a series of I/O requests generated by one or more clients 214 and 216 and/or an application running on one or more clients 214 and 216. In the example, the system 214 may correspond to Client 1, while system 216 may correspond to Client 2.

Thus, a data storage emulation system and method have been described, in which each of multiple clients receives a level of service which may be specified by the client in terms of service provided by a device (i.e. the emulated device or devices) that may be different than the device (i.e. the emulation device or devices) that actually provides storage service to the client. Delivery of the specified level of service is ensured by allocating the stores of each workload in such way that the required storage capacity and performance (e.g., I/O bandwidth) are available that meet or exceed the aggregate requirements of all the workloads. While the examples refer to two clients and to two workloads, it will be apparent that more or fewer clients and workloads may be serviced by the invention.

The above-described scheme can respond to changes in the workloads by reallocating the stores, as in step 104. However, such reallocation may not respond to some dynamic variations in the workloads. For example, where one or more of the workloads is bursty, in which its demands on the emulation device 204 change dramatically over relatively short periods of time (e.g., less than a few seconds), such a workload may temporarily consume more than its share of the resources of the emulation device 204, thus, possibly interfering with the other workloads. One way to limit this is to allocate resources to each workload in step 103 based on worst-case loading. For example, worst-case values of performance characteristics may be obtained in step for each device to be emulated. This may include, for example, determining the maximum bandwidth that the device can handle and/or the minimum latency the device provides under a worst-case expected load. Also, worst-case workload characteristics may be obtained, such as a maximum request rate during bursts. Then, the allocation of step 104 may be performed based on these worst-case characterizations. This approach has a disadvantage in that the SSP will tend to allocate more resources than needed to meet the performance expectations of each client most of the time.

Thus, in one embodiment, quality-of-service (QoS) control is performed to provide a degree of performance isolation, in which the performance experienced by a workload is less affected by variations in the other workloads, and to better ensure that performance objectives are satisfied. By balancing multiple workloads among the storage resources, efficient use is made of the resources. In this embodiment, a level of virtualization is added between one or more clients and one or more emulation storage devices by intercepting input/output (I/O) requests from the clients and forwarding them to the storage devices while selectively throttling the rate at which they are forwarded. Each request is scheduled for delivery to the storage devices, while its completion is monitored. Based on statistical information obtained from completed requests, the scheduling may then be altered in an attempt to maintain desired performance for each workload.

By performing QoS control, the performance characterizations and workload specifications can be based on statistical means (e.g., averages), rather than worst-case criteria. This is because the QoS control will improve the ability of the system to respond to dynamic changes in the workloads, such as bursts in an I/O request rate.

Figure 3:
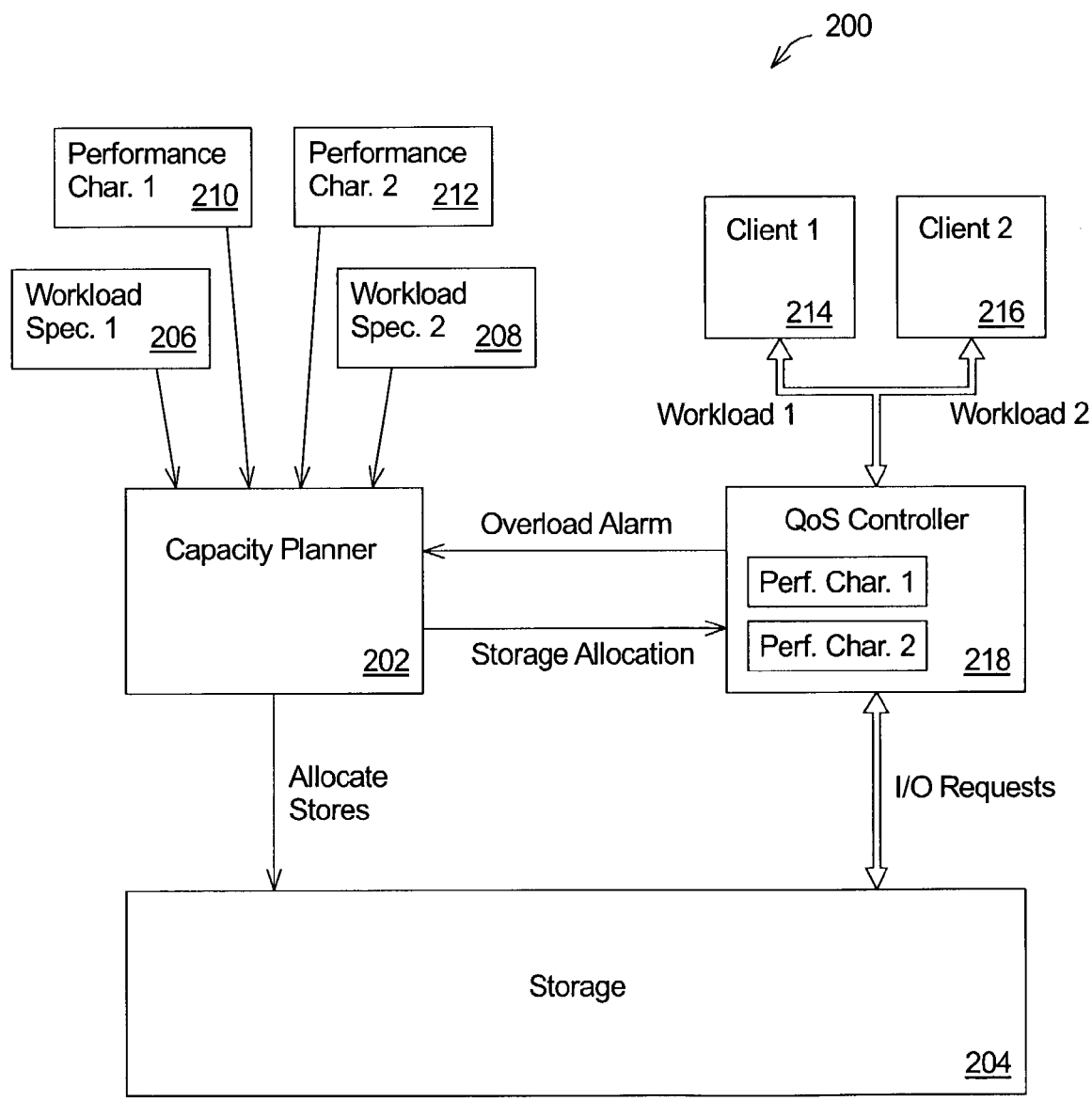
FIG. 3 illustrates an alternate embodiment of the data storage emulation system according to an aspect of the invention.

FIG. 3 illustrates an alternate embodiment of the data storage emulation system of FIG. 2. As shown in FIG. 3, a quality-of-service controller 218 receives the I/O requests generated by the client systems 214-216. In response, the controller 218 communicates with the emulation storage device 204 to complete the requests. In addition, the controller 218 may receive storage allocation information from the capacity planner 202 which the controller 218 may use to identify the particular workload to which each request belongs. If the controller 218 is unable to meet performance objectives for the workloads, the controller 218 may signal the capacity planner 202, such as by communicating an overload alarm. When this occurs, the capacity planner 202 may take appropriate action, such as by re-allocating stores to device 204, exchanging the device 204 with one or more others that have more capacity and/or bandwidth or by increasing the number of devices 204 or components thereof to increase the overall capacity and/or bandwidth of the devices 106.

Figure 4A:
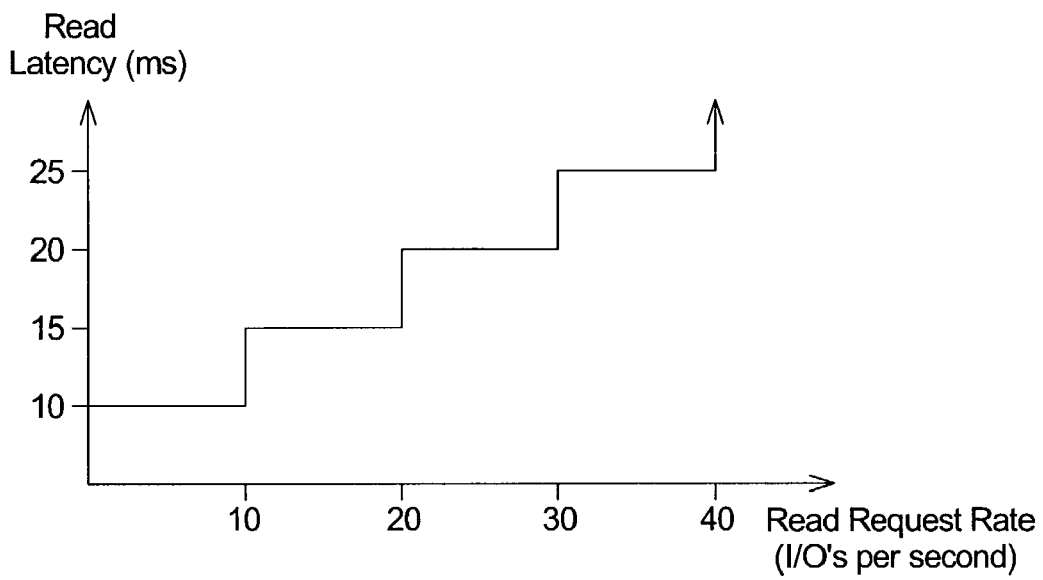
FIGS. 4A and 4B illustrate exemplary performance requirements for a workload.
Figure 4B:
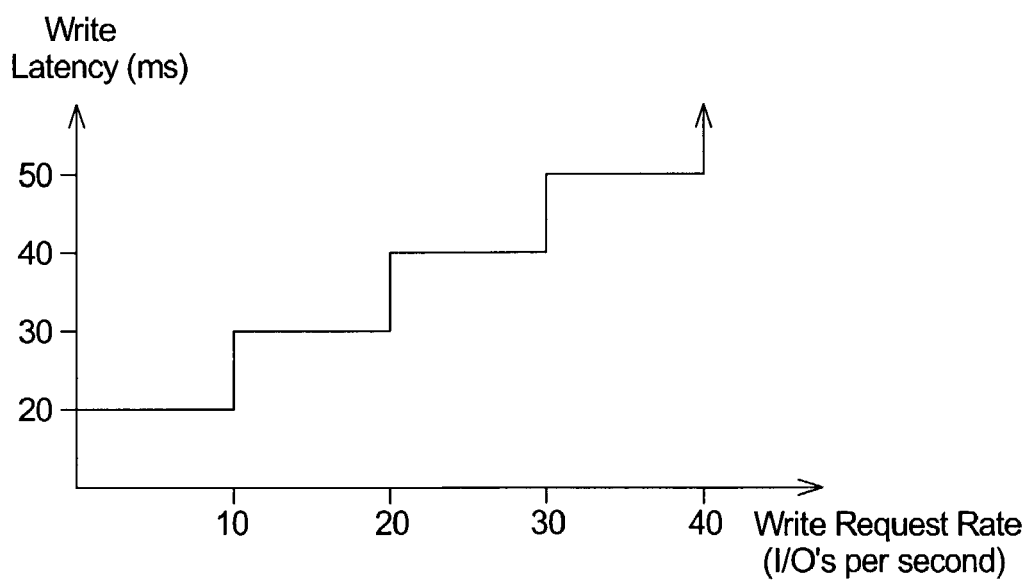

Objectives of the performance characterizations for each workload may be specified by a pair of curves, one each for specifying read and write latency as a function of offered request rate, averaged during a time window w. FIGS. 4A and 4B illustrate exemplary performance requirements for a workload. More particularly, FIG. 4A shows a graph with a rate of issuance of read requests, in I/O's per second, on the horizontal axis and a not-to-exceed maximum latency in milliseconds (averaged during a period w) on the vertical axis. Latency is the time required to process a given request, which may be measured as the amount of time elapsed between the controller 218 receiving the request from a host 108 and the storage device 106 completing the request. As shown in FIG. 4A, for read request rates below 10 I/O's per second, a maximum latency of 10 ms is allowed. For read request rates between 10 and 20 I/O's per second, a maximum latency of 15 ms is allowed and for read request rates between 20 and 30 I/O's per second, a maximum latency of 20 ms is allowed. In addition, for read request rates between 30 and 40 I/O's per second, a maximum latency of 25 ms is allowed. While not required, no limit is placed on latency for I/O request rates beyond 40 I/O's per second.

Figure 5:
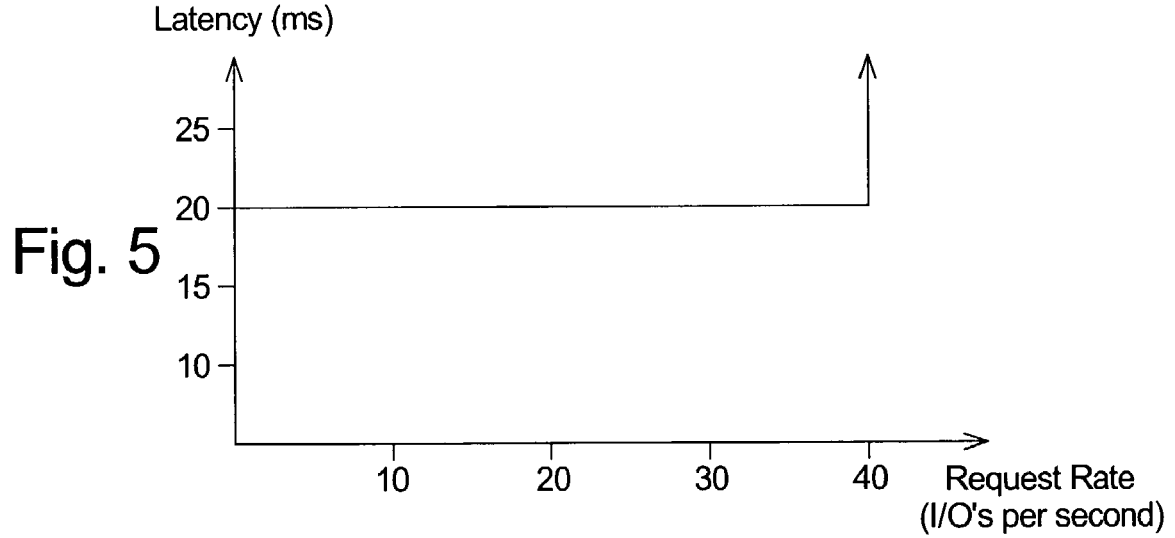
FIG. 5 illustrates alternate exemplary performance requirements in which a single latency limit applies to all request rates below a threshold.

FIG. 4B shows a graph of latency limits for write requests. As shown in FIG. 4B, for write request rates below 10 I/O's per second, a maximum latency of 20 ms is allowed. For write request rates between 10 and 20 I/O's per second, a maximum latency of 30 ms is allowed and for request rates between 20 and 30 I/O's per second, a maximum latency of 40 ms is allowed. In addition, for write request rates between 30 and 40 I/O's per second, a maximum latency of 50 ms is allowed. Similarly, to FIG. 4A, no limit is placed on latency for I/O request rates beyond 40 I/O's per second. While the performance objectives illustrated in FIGS. 4A and 4B differ for read requests and write requests, it will be apparent that the same objectives may apply to both. Further, there can be fewer or more latency limits specified. For example, FIG. 5 shows a graph in which a single latency limit of 20 ms applies to all request rates below 40 I/O's per second.

In general, these two curves can be represented as a vector of triples: $((r_1,tr_1,tw_1,), (r_2,tr_2,tw_2), \ldots, (r_n,tr_n,tw_n))$, where $0 < r_1 < \ldots < r_n$ and where r is the request rate, tr is the maximum latency for read requests and tw is the maximum latency for write requests. Because no limit is placed on latency for request rates beyond $r_n$, this can be expressed as: $tr_{n+1} = tw_{n+1} = \infty$. Thus, the curves of FIGS. 4A and 4B can be expressed as: ((10 IO/s, 10 ms, 20 ms), (20 IO/s, 15 ms, 30 ms) (30 IO/s, 20 ms, 40 ms), (40 IO/s, 25 ms, 50 ms)).

Time may be divided into windows (epochs) of w. Each window w may be on the order of one second, though another window length may be selected. Thus, to determine whether the maximum latency is exceeded, measured latencies are averaged over a time period of w. Thus, for a workload with a fraction fr of the total I/O requests being read requests to meet the performance requirements, the average latency over any time window $W_i$ should not exceed $fr*tr_i+(1-fr)tw_i$ where the average request rate over the previous window w is less than $r_i$. This formula implies a latency bound of $tr_i$ for read-only workloads, $tw_i$ for write-only workloads, and a linear interpolation between the two bounds for mixed read/write workloads. However, it is not necessary to combine measured latencies in this manner. For example, throttling of requests could be based on observed read latencies only or on observed write latencies only, particularly where a workload is dominated by one or the other. Also, where latency objectives are the same for read and for write requests, there would not be a need to distinguish between latencies observed for each.

In general, the performance objective for a workload may be any computable function that specifies the latency required, based on any set of measurable characteristics of the workload. For example, the latency may be specified as a function of I/O size, or a combination of I/O size and whether the requests are read or write. The function may be a mathematical function or, as in this case, specified by a table. While the performance objectives for reads and writes are combined into a single objective function here, they may also be kept separate. For example, read requests and write requests from a workload may be placed into separate input queues and separate latency bounds may be associated with each. Similarly, requests may be separated into separate input queues based on other criteria. For example, if the performance objective specifies separate latency functions for small I/Os (e.g., less that 64 KB) and large I/Os (e.g., greater than or equal to 64 KB), then large and small I/O requests may be separated into separate input queues and the corresponding performance requirements applied to them separately, thereby treating them as separate workloads.

Figure 6:
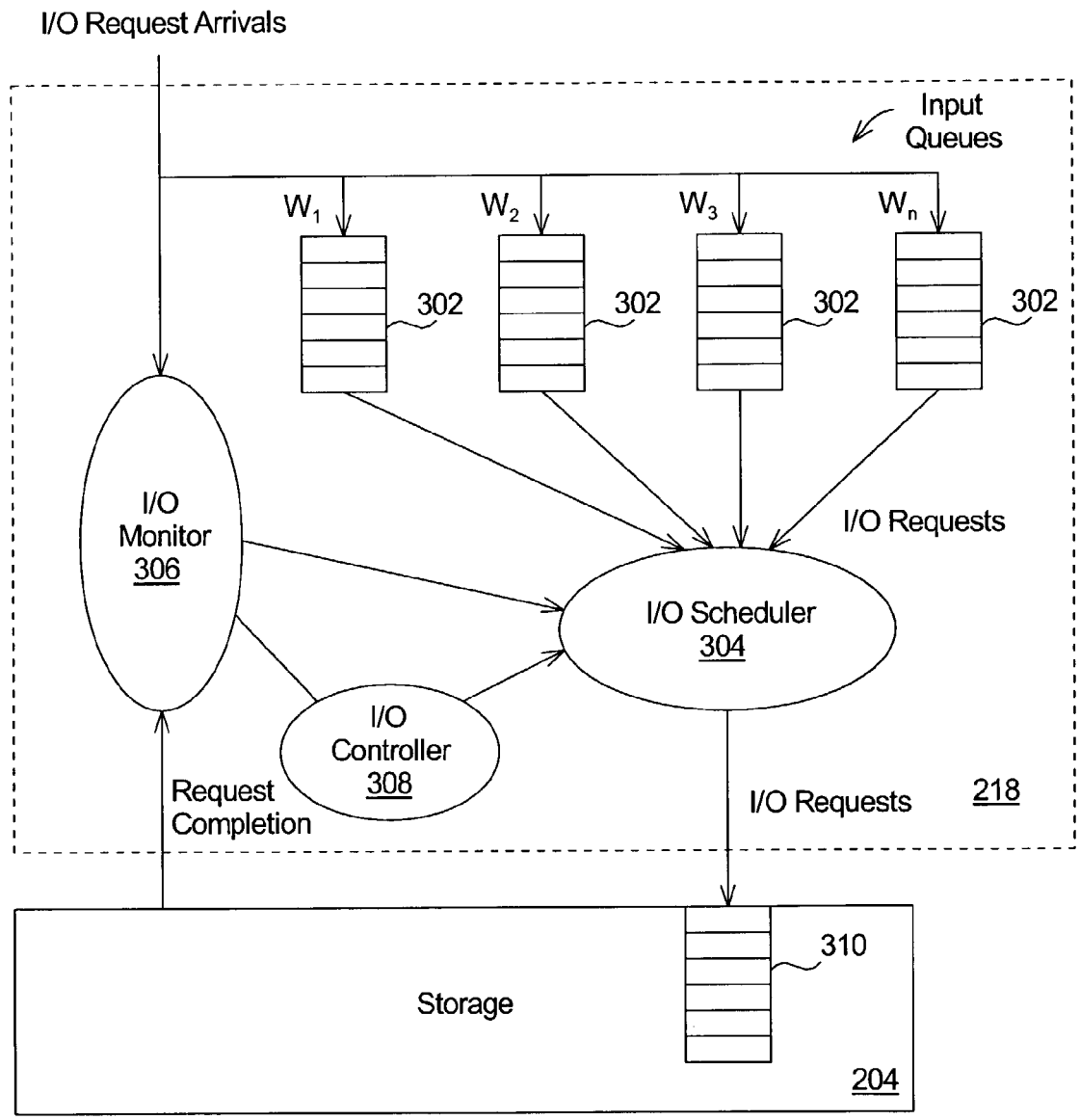
FIG. 6 illustrates a quality-of-service storage controller according to an aspect of the invention.

FIG. 6 illustrates an embodiment of the quality-of-service storage controller 218 of FIG. 1 in more detail. The controller 218 includes input queues 302, an I/O scheduler 304, an I/O monitor 306 and an I/O controller 308. The queues 302 may be implemented by memory devices configured as buffers, while the scheduler 304, monitor 306 and controller 308 may be implemented by general or special-purpose hardware and/or software.

FIG. 6 also illustrates a device queue 310 which is conventionally part of a storage system and is, thus, included in device 204. Removal of requests from device queue 310 and sorting of requests within the device queue 310 may be under control of the device 204 and, thus, the device queue 310 operates independently of the QoS controller 218. For example, a typical storage device (that may be used in the devices 106) may implement a scheme for sorting requests among those in the device queue 310 that is proprietary to the manufacturer of the device. Thus, the invention is compatible with commercially available storage devices. However, the QoS controller 218 controls the flow of requests to the device queue 310.

Requests arriving at the QoS controller 104 (e.g., from hosts 108) are queued in the input queues 302 where the requests from each workload are preferably assigned to a particular one of the queues 302. Based on repeated input from the I/O monitor 306 and the I/O controller 308, the scheduler 304 maintains a target queue depth value for the device queue 310 and per-workload latency targets which the scheduler 304 attempts to maintain.

The scheduler 304 prioritizes the requests for each workload against the other requests in the same workload. This may be accomplished using earliest deadline first (EDF) scheduling in which the deadline for a request from a workload $W_k$ is computed as the arrival time arrivalTime($W_k$) of the request plus the latency target for the workload latencyTarget($W_k$). Thus, the deadline for a request from workload $W_k$ can be computed as arrivalTime($W_k$)+latencyTarget($W_k$). The deadline for a workload is considered to be the same as the oldest pending request in the workload.

The scheduler 304 polls the device queue 310 repeatedly to determine a then-current queue depth (i.e. the number of requests pending in the queue 310). Alternately, the scheduler 112 may compute the current device queue depth based on I/O request arrival and completion information from the monitor 114, for example, where the device 106 does not support reporting of the depth of the device queue 118. Preferably, the queue depth is polled periodically (e.g., every 1 ms) and also upon completions of I/O requests. Requests from a workload are forwarded to the device queue 310 under specified circumstances: A request may be forwarded to the device queue 310 when the current depth of the device queue 310 is less than the target specified by the I/O controller 308. In this case, the scheduler 304 selects the workload with the earliest deadline and forwards the first request (i.e. the request having the earliest deadline) in its corresponding queue 302 to the device queue 310. The scheduler 304 repeats these steps of selecting a workload with the next earliest deadline and forwarding the first request of that workload to the device queue 310 until the current depth of the device queue 310 reaches the target depth. Thus, the requests are prioritized in the input queues 302 and a highest priority one of the requests is forwarded to the device queue 310 so as to maintain the device queue 310 at its target depth. A request may also be forwarded to the device queue 310 when its deadline has already passed. All past-due requests are preferably forwarded to the device queue 310 even if this causes the depth of the device queue 310 to exceed its target depth. This allows newly-arrived requests for workloads with low latency requirements to be immediately served.

The I/O monitor 306 monitors I/O request arrivals and completions. More particularly, the monitor 306 may monitor the rate of arrival at the QoS controller 104 of new read and write requests for each workload and also report this information to the I/O controller 308. Recall that the performance objective may specify a maximum latency based on the request rates. Accordingly, the target latency for each workload may be determined periodically based on the then-current request rates. More particularly, where the performance objectives are given as $((r_1,tr_1,tw_1,), (r_2,tr_2,tw_2), \ldots, (r_n,tr_n, tw_n))$, the latency target for a workload $W_k$ that includes read and write requests may be computed as follows:

latencyTarget($W_k$)=$fr*tr_i+(1-fr)tw_i$, if $r_{i-1} \leq$ readRate($W_k$)+writeRate($W_k$)<$r_i$ where readRate($W_k$) is the read request rate for the workload $W_k$, writeRate($W_k$) is the write request rate for the workload $W_k$, and $r_0=0$, $r_{n+1}=\infty$, $tr_{n+1}=tw_{n+1}=\infty$. The targets are preferably determined and reported periodically, every P=0.05 seconds, though it will be apparent that another period P may be selected.

In addition to monitoring the request arrival rates, the I/O monitor 306 preferably also monitors the time of arrival of each I/O request as the requests are received into the QoS controller 104. In addition, the monitor 306 monitors the completion time for each request reported by the devices 106. From this, the monitor 306 may compute the latency for each request and average latencies for each workload (over time periods of w). The average latencies are then reported to the controller 308. The latency averages are preferably computed and reported periodically, every P=0.05 seconds, though it will be apparent that another period may be selected.

In response to the average latency information, the controller 308 may adjust the target depth of the device queue 310. This control is based on the assumption that reducing the depth of the device queue 310 tends to reduce the latency at the devices 106 but also tends to reduce throughput. Conversely, increasing the depth of the device queue 310 tends to increase latency and also tends to increase throughput. This assumption is expected to be true for most disks and disk arrays.

The controller 308 attempts to maintain the device queue 310 full (i.e. at its target depth). This is because a having many requests in the device queue 310 improves utilization of the devices 106 and, thus, maximizes throughput. However, having too many requests in the device queue 310 tends to result in unacceptable latencies. For example, when a workload demands a low latency, having many requests in the device queue 310 means that a next request from the workload will be competing with many other outstanding requests in the queue 310; therefore, the request will be completed more slowly (with higher latency) than if the queue 310 had fewer outstanding requests. Thus, maintaining the device queue 310 at its target depth tends to maximize utilization of the storage devices 106 without resulting in excessive latency. The target queue depth is adjusted to maintain this balance.

In a particular implementation, the controller 308 compares the current target latencies for each workload to its average latency measured during the prior period for adjusting the target depth of the device queue 310. If any workload has a new target latency that is lower than its prior measured latency, the target depth of the device queue 310 is reduced. The amount of reduction in the target depth is preferably proportional to the largest difference among the workloads between the target latency and the measured latency. For example, in a system with two workloads $W_1$ and $W_2$, if the new target latency for workload $W_1$ is 10% lower than its measured value and the new target latency for workload $W_2$ is 5% lower than its measured value target, the target depth of the device queue 310 is preferably reduced by 10% from the prior target depth for the device queue 310. It will be apparent, however, that the reduction in the target for the device queue 310 can be determined in another manner. For example, the amount of reduction may be statistically determined from the difference between target and measured values for two or more of the workloads (e.g., by averaging). Conversely, if all of the new target latencies are longer than the measured latencies for all of the workloads, the target depth of the device queue 310 may be increased to allow for greater throughput. For example, the target depth may be increased by a predetermined multiplier. For example, where the multiplier is 0.1, target depth is increased to 110% of its prior value, though another multiplier may be selected. Increasing the target depth for the device queue 310 is expected to increase throughput only where the actual queue depth attained was limited by the target depth. Accordingly, whether to increase the target depth may be determined based on whether the queue depth attained was limited by the target depth. If neither of these conditions applies, then the target depth of the device queue 310 may remain unchanged.

Thus, the controller 308 may implement non-linear feedback to adjust the target depth for the device. Formally, the above-described feedback scheme may be represented by the following:

$$E = \min_k \frac{latencyTarget(W_k)}{L(W_k)}$$

$$Q_{new} = \begin{cases} E*Q_{old} & \text{if } E < 1, \\ (1+\varepsilon)Q_{old} & \text{eles if } Q_{max} \geq Q_{old}, \\ Q_{old} & \text{otherwise.} \end{cases}$$

where $Q_{new}$ is the new target depth for the device queue 310, $Q_{old}$ is the prior target depth for the device queue 310, $Q_{max}$ is the maximum depth the device queue 310 attained in the prior period, $L(W_k)$ is measured average latency for the workload $W_k$, and $\varepsilon$ is a predetermined small positive value (e.g., 0.1). Initially, the target queue depth is set to an initial value (e.g., 200 entries).

Thus, a quality-of-service system and method for data storage system emulation has been described. This aspect of the invention provides a degree of performance isolation, in which the performance experienced by a workload is less affected by variations in the other workloads, and better ensures that performance objectives are satisfied.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of emulating a data storage system comprising:

obtaining a performance characterization of a data storage device to be emulated and a specification of a workload, the specification of the workload including a specification of a plurality of data stores for the workload;

assigning the data stores to an emulation data storage device according to the performance characterization and according to the specification of the workload such that sufficient resources of the emulation data storage device are allocated to the workload to meet the performance characterization of the data storage device to be emulated; and operating the emulation data storage device under the workload.

2. The method according to claim 1, wherein the emulation data storage device comprises a plurality of data storage devices aggregated by a logical volume manager.

3. The method according to claim 1, said obtaining including obtaining a plurality of specifications for each of a plurality of workloads and wherein said operating includes operating the emulation data storage device under each of the plurality of workloads.

4. The method according to claim 3, wherein each of the plurality of workloads corresponds to each of a plurality of performance characterizations for each of a plurality of data storage devices to be emulated.

5. The method according to claim 3, wherein said operating further comprises performing quality-of-service control for a plurality of workloads.

6. A method of emulating a data storage system comprising:

obtaining a performance characterization of a data storage device to be emulated and a plurality of specifications of a workloads, the specifications of the workloads including a specification of a plurality of data stores for the workloads;

assigning the data stores to an emulation data storage device according to the performance characterization and according to the specification of each workload such that sufficient resources of the emulation data storage device are allocated to each workload to meet the performance characterization; and operating the emulation data storage device under each of the plurality of workloads and performing quality-of-service control by:

prioritizing a plurality of requests for each of the plurality of workloads;

selectively forwarding the requests to a device queue of the emulation device according to said prioritizing for maintaining the queue at a target queue depth, wherein completed requests are removed from the queue; and adjusting the target queue depth in response to a monitored latency statistic for the requests.

7. The method according to claim 6, wherein said prioritizing comprises computing a target deadline for a request.

8. The method according to claim 7, further comprising forwarding any request having a past due target deadline to the queue.

9. The method according to claim 8, wherein said forwarding any request having a past due target deadline is performed even when a queue depth attained exceeds the target queue depth.

10. The method according to claim 7, wherein the workload of the request has a target latency and wherein said computing the target deadline for the request comprises combining the target latency of the workload with an arrival time of the request.

11. The method according to claim 10, further comprising monitoring requests of the workload during a time interval for determining a rate of requests for the workload.

12. The method according to claim 11, further comprising adjusting the target latency based on the request rate.

13. The method according to claim 6, further comprising assigning the requests of each workload to a corresponding input queue prior to said forwarding to the device queue.

14. The method according to claim 6, wherein the computed latency statistic is for a workload having a target latency and wherein said adjusting the target queue depth comprises reducing the target queue depth when the target latency for the workload is less than the computed latency statistic.

15. The method according to claim 14, wherein the target queue depth is reduced proportionally based on comparative values of the target latency and the computed latency statistic.

16. The method according to claim 6, wherein the computed latency statistic is for a workload having a target latency and wherein each workload has a target latency and a computed latency statistic and wherein said adjusting the target queue depth value comprises increasing the target queue depth when each target latency is greater than each computed latency statistic.

17. The method according to claim 6, wherein the device queue has an attained queue depth as of result of said selectively forwarding and further comprising increasing the target queue depth value when the attained queue depth is limited by the target queue depth.

18. The method according to claim 17, wherein said increasing the target queue depth increases the target queue depth by a predetermined multiplier.

19. A method of emulating a data storage system comprising:

obtaining a performance characterization of a data storage device to be emulated and a plurality of specifications of workloads, the specifications of the workloads including a specification of a plurality of data stores for the workloads;

assigning the data stores to an emulation data storage device according to the performance characterization and according to the specification of each workload such that sufficient resources of the emulation data storage device are allocated to each workload to meet the performance characterization; and operating the emulation data storage device under each of the plurality of workloads and performing quality-of-service control by:

receiving a function that specifies an allowable latency statistic for each of a plurality of workloads, each workload including a plurality of requests; and scheduling and forwarding the requests to a data storage device for substantially maintaining a monitored latency statistic within the allowable latency statistic for each workload.

20. The method according to claim 19, wherein said scheduling comprises prioritizing the requests according to a target deadline for each request.

21. The method according to claim 20, wherein said forwarding is performed for maintaining a target queue depth at the data storage device.

22. The method according to claim 21, further comprising reducing the target queue depth when the allowable latency statistic for the workload is less than the monitored latency statistic.

23. The method according to claim 21, further comprising increasing the target queue depth when each allowable latency statistic is greater than each monitored latency statistic.

24. A system for emulating a data storage system comprising:

a capacity planner for assigning each of a plurality of data stores to an emulation data storage device according to a performance characterization of a data storage device to be emulated and according to a specification of a plurality of workloads, each workload specifying one or more of the data stores and performance characteristics of a data storage device to be emulated for the workload, wherein the capacity planner ensures that sufficient resources of the emulation data storage device are allocated to each workload to meet the performance characteristics of the data storage device to be emulated for the workload; and a quality-of-service controller for intercepting input/output (I/O) requests of the workloads and for selectively forwarding them to the emulation data storage device according to the performance characteristics of the data device to be emulated for each workload.

25. The system according to claim 24, wherein a function specifies an allowable latency statistic for each of the workloads and wherein the quality of service controller schedules and forwards requests for each workload to the data storage device for substantially maintaining a monitored latency statistic within the allowable latency statistic for each workload.

26. The system according to claim 25, wherein the quality of service controller schedules the requests by prioritizing the requests according to a target deadline for each request.

27. The method according to claim 26, wherein the quality of service controller forwards the requests so as to maintain a target queue depth at the data storage device.

28. The system according to claim 24, wherein the quality-of-service controller comprises:

a plurality of input queues for receiving requests from a plurality of workloads, wherein each workload is assigned to a corresponding one of the input queues and wherein requests in each input queue are prioritized;

means for monitoring a performance value for requests of each workload;

means for selectively forwarding the requests from the input queues to a storage device queue and for selecting a highest priority one of the requests for forwarding to the storage device queue according to a target depth of the storage device queue; and means for adjusting the target depth of the storage device queue according to the performance value for the requests of each workload.

29. The system according to claim 28, wherein the requests in each queue are prioritized according to a target deadline assigned to each request.

30. The system according to claim 29, wherein the target deadline for each request is determined from a time of arrival of the request and a target latency for the workload of the request.

31. The system according to claim 30, wherein the means for monitoring monitors a rate of requests for each workload for adjusting the target latency for each workload.

32. The system according to claim 28, wherein the performance value for requests of each workload comprises a latency statistic.

33. The system according to claim 32, wherein the means for adjusting reduces the target depth when the target latency for each workload is less than the latency statistic for any workload.

34. The system according to claim 33, wherein the target depth is reduced proportionally based on comparative values of the target latency and the latency statistic for the workloads.

35. The system according to claim 32, wherein the means for adjusting increases the target depth when each target latency for each workload is greater than the corresponding latency statistic.

36. The system according to claim 32, wherein the device queue has an attained queue depth and wherein the means for adjusting increases the target queue depth value when the attained queue depth is limited by the target depth.

37. The system according to claim 36, wherein the target depth is increased by a predetermined multiplier.

38. The system according to claim 32, wherein the means for adjusting adjusts the target depth of the storage device queue according to the following:

$$E = \min_k \frac{latencyTarget(W_k)}{L(W_k)}$$

$$Q_{new} = \begin{cases} E * Q_{old} & \text{if } E < 1, \\ (1+\varepsilon)Q_{old} & \text{eles if } Q_{max} \geq Q_{old}, \\ Q_{old} & \text{otherwise.} \end{cases}$$

wherein $Q_{new}$ is the adjusted target depth for the storage device queue, $Q_{old}$ is a prior target depth for the storage device queue, $Q_{max}$ is a maximum depth the device queue attained in a prior predetermined period, $L(W_k)$ is the latency statistic for a workload $W_k$, and $\varepsilon$ is a predetermined multiplier.

* * * * *

UNITED STATES PATENT AND TRADEMARK OFFICE
CERTIFICATE OF CORRECTION

PATENT NO. : 7,643,983 B2  Page 1 of 1
APPLICATION NO. : 10/400232
DATED : January 5, 2010
INVENTOR(S) : Christopher Lumb et al.

It is certified that error appears in the above-identified patent and that said Letters Patent is hereby corrected as shown below:

In column 4, line 10, after "system" insert -- 200 --.

In column 4, line 31, after "step" insert -- 102 --.

In column 5, line 60, after "step" insert -- 102 --.

In column 6, line 26, after "system" insert -- 200 --.

In column 12, lines 38-39, in Claim 19, delete "quality-of -service" and insert -- quality-of-service --, therefor.

Signed and Sealed this

Thirteenth Day of July, 2010

David J. Kappos
*Director of the United States Patent and Trademark Office*